United States Patent
Hardin et al.

(10) Patent No.: US 6,694,146 B1
(45) Date of Patent: *Feb. 17, 2004

(54) METHOD FOR REDUCING TIME REQUIRED TO RECEIVE AND DECODE A TEMPORARY EQUIPMENT IDENTIFIER MESSAGE

(76) Inventors: Carl Thomas Hardin, 1045 Hermes St., Encinitas, CA (US) 92024; James E. Petranovich, 1190 Encinitas Blvd., #F219, Encinitas, CA (US) 92024; Kumar Balachandran, 302 Ravenstone Dr., Cary, NC (US) 27511; Andrew Wright, #310-1432 W. 10th Ave., Vancouver, BC (CA), VG4 IJ9

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 939 days.

(21) Appl. No.: 08/534,855

(22) Filed: Sep. 27, 1995

Related U.S. Application Data

(63) Continuation-in-part of application No. 08/533,152, filed on Sep. 25, 1995, now abandoned.

(51) Int. Cl.[7] .............................. H04B 7/00; H04B 1/16; H04Q 7/20

(52) U.S. Cl. .................................... 455/515; 455/343.1
(58) Field of Search ................... 379/58, 59; 455/33.1, 455/343; 370/95.1, 95.3; 340/825.44

(56) References Cited

U.S. PATENT DOCUMENTS 5,199,031 A * 3/1993 Dahlin ........................ 455/515
5,265,270 A * 11/1993 Stengel et al. .............. 455/343

OTHER PUBLICATIONS

Cellular Digital Packet Data (CDPD) Specification, Version 1.1 (402–1 to 402–52, 403–1 to 403–74) Jan. 19, 1995.

* cited by examiner

*Primary Examiner*—William Cumming
(74) *Attorney, Agent, or Firm*—Steven Lin, Esq.

(57) ABSTRACT

Energy expenditure is reduced in a wireless subscriber station operating in a Cellular Digital Packet Data (CDPD) system by deleting the operation of decoding the Forward Error Correction (FEC) blocks. The decoding of the FEC blocks can be deleted by virtue of using opening and closing Temporary Equipment Identifier (TEI) messages having a minimum hamming distance from all the other TEI messages. Base Error Rate (BER) is measured to determine when the necessity of decoding an FEC block exists. By limiting this operation, battery life for wireless subscriber stations is prolonged.

26 Claims, 7 Drawing Sheets

METHOD FOR REDUCING TIME REQUIRED TO RECEIVE AND DECODE A TEMPORARY EQUIPMENT IDENTIFIER MESSAGE

This is a continuation-in-part application of Ser. No. 08/533,152, filed Sep. 25, 1995 now abandoned.

TECHNICAL FIELD

This invention relates generally to wireless communication devices. More particularly, the invention relates to controlling the scanning operation of a wireless subscriber station to limit power consumption and extend the life of a battery powering the wireless subscriber station.

BACKGROUND OF THE INVENTION

The modern analog cellular system for mobile wireless duplex voice transmission called "Advanced Mobile Phone Service" (AMPS), uses the FCC assigned carrier frequency range of 800 to 900 MHz. Automobile-mounted cellular units transmit voice signals to a cellular base station within a given cell at up to one watt of power. Battery powered, hand-held cellular units transmit voice signals to a cellular base station within a given cell using up to one quarter watt of transmission power.

The analog human voice was the signal that the AMPS system was first designed to communicate. AMPS was optimized for carrying as many analog voice signals within a given bandwidth of a channel as possible. Mobility of the cellular telephone using low power mobile units, FM modulation, and the higher carrier frequency range (800 MHz–900 MHz) is achieved through a cellular arrangement of base stations, with a user's signal handed off to the next cell site as he or she moves outside the current cell area. This cellular hand-off can cause a temporary loss in transmission or reception. Whereas, temporarily losing a voice signal is not critical because a user knows when there is a signal loss and the voice information can be retransmitted, signal loss, even if temporary, poses special problems for digital data transmission. Other sources of loss in voice signal transmission are drops in signal strength, reflections, Rayleigh fading, and cellular dead spots.

The availability of portable computers naturally led to the desire to conduct wireless transmission of digital data from a remote location. Presently, the AMPS voice cellular system is being used to transmit digital data in the form of circuit-switched cellular data across AMPS carrier channels. Raw (baseband) digital data must be converted so that it can be transmitted and received across the analog AMPS system. One disadvantage of the AMPS system for data transmission is that narrow channel bandwidth and transmission errors limit the baud rate for transmitting and receiving digital data. Again, loss of raw digital data may also be caused by other sources in the AMPS mobile cellular system.

Efficient wireless communication of both voice and data signals in an integrated package accordingly has been difficult. Furthermore, it has been difficult to integrate AMPS voice transmission features with applications such as data transmission, electronic mail and duplex paging, as well as enable provisions of a circuit-switched cellular data interface such as a wireless fax-modem, into a single hand-held battery operated wireless unit. This has been accomplished in part by the systems disclosed in the common assignee's U.S. patent applications Ser. No. 08/117,913 (filed Sep. 8, 1993) and Ser. No. 08/152,005 (filed Nov. 12, 1993) using a Cellular Digital Packet Data (CDPD) system described in the CDPD specification, Version 1.1, incorporated herein by reference as background material. The CDPD communication system shares the same carrier frequencies assigned to the AMPS channels as described in Part 405, Version 1.1 of the CDPD specification (the CDPD specification is incorporated herein by reference).

The typical base unit or mobile data base station (MDBS 1, as illustrated in FIG. 1 herein), of a CDPD system utilizes a channel within an AMPS cell to establish a link and communicate to a user's wireless subscriber station. The MDBS may use other frequencies outside of AMPS that are made available to it by service providers. The wireless subscriber station (M-ES 2) is a portable computer, hand-set or other portable electronic device containing a subscriber communication station. The MDBS serves as a communications link between the user of the wireless subscriber station M-ES 2 and a service provider's network of wire lines, microwave links, satellite links, AMPS cellular links, or other CDPD links (such as mobile data intermediate system MD-IS 3 and intermediate systems 4, 5, 6) to convey data to another wireless subscriber station, computer network, or non-mobile or fixed end-user system (F-ES 7, 8).

The CDPD network is designed to operate as an extension of existing communication networks, such as AMPS networks and the Internet network. From the mobile subscriber's perspective, the CDPD network is simply a wireless mobile extension of traditional networks. The CDPD network shares the transmission facilities of existing AMPS networks and provides a non-intrusive, packet-switched data service that does not impact AMPS service. In effect, the CDPD network is entirely transparent to the AMPS network, which is "unaware" of the CDPD function.

The CDPD system employs connectionless network services (CLNS) in which the network routes each data packet individually based on the destination address carried in the packet and knowledge of current network topology. The packetized nature of the data transmissions from an M-ES 2 allows many CDPD users to share a common channel, accessing the channel only when they have data to send and otherwise leaving it available to other CDPD users. The multiple access nature of the system makes it possible to provide substantial CDPD coverage to many users simultaneously with the installation of only one CDPD station in a given sector (transmitting range and area of a standard AMPS base station transceiver).

The airlink interface portion of the CDPD network consists of a set of cells. A cell is defined by the geographical boundaries within the RF transmission range from a fixed transmission site such as MDBS 1, which can be received at acceptable levels of signal strength by mobile subscribers such as M-ES 2. The transmitter supporting the cell may be located centrally within the cell, with transmission being carried out via an omni-directional antenna, or the transmitter located at the edge of a cell and transmitted via a directional antenna to cover only a portion of the cell, referred to as a sector. In typical configurations, the transmitters for several sectors are co-located. The area served by a set of cells has some area overlap so that a roaming wireless subscriber station can maintain continuous service by switching from one cell to an adjacent cell in a manner roughly analogous to the standard hand-off in an AMPS system. The two cells are considered to be adjacent if an M-ES can maintain continuous service by switching from one cell to the other. This switching process, called cell transfer, is done independently of normal AMPS hand-off procedures.

In FIG. 1, the interface (A) between the wireless subscriber station 2 and the MDBS 1 is an "air interface" constituted by a radio frequency link using standard AMPS frequencies. The MDBS 1 is connected to other mobile data base stations through a mobile data intermediate system (MD-IS) 3. A number of mobile data base stations can be under the control of a single mobile data intermediate system. The mobile data intermediate systems are connected to each other through intermediate systems such as 4 and 5 in FIG. 1.

The intermediate systems are constituted by at least one node connected to more than one sub-network (such as intermediate system MD-IS 3). The intermediate system has a primary role of forwarding data from one sub-network to another. The mobile data MD-IS 3 performs data packet routing based on knowledge of the current location of each wireless subscriber station within the range of the mobile data base stations under the control of the MD-IS. The MD-IS is the only network entity that is "aware" of the location of any of the wireless subscriber stations. However, under some circumstances (as defined by the CDPD specification, Version 1.1), particular mobile data base stations will keep track of behavior of specific wireless subscriber stations. A CDPD-specific Mobile Network Location Protocol (MNLP) is operated between each MD-IS (through the intermediate system) to exchange location information regarding the wireless subscriber stations.

The overall CDPD network is controlled by a network management system (NMS) 10 having an interface with at least one mobile data intermediate system 3. Using a special protocol, programming instructions can be transmitted from the NMS 10 through the MD-IS 3 to any number of mobile data base stations under proper conditions.

Such programming instructions can be used to convey useful network data to the MDBS, as well as configure the operation of an MDBS with respect to such critical features as maintaining channel queues. The NMS also controls other CDPD system characteristics such as the timing of paging messages to coincide with non-dormant periods of the M-ES hand-sets. One advantage of CDPD is the capability of providing operating instructions to mobile data base stations from the NMS 10 through an MD-IS 3, or by a direct connection to the MDBS as outlined in the description of MDBS architecture found in the CDPD specification, Version 1.1, Parts 402 and 403.

FIG. 2 depicts a comparison between the CDPD network of FIG. 1 and a standard AMPS network. The MDBS 1 is the CDPD equivalent of an AMPS base station 21. Both serve as links to mobile users, 2, 2', and 2" for the CDPD system and 22, 22' and 22" for AMPS users. Both AMPS and CDPD functions can be handled by the same hand-set or end system equipment. Also, the MDBS 1 is preferably located with the AMPS base station 21 as explained in greater detail later.

The MD-IS 3, which acts as a local controller for the CDPD mobile data base stations connected to it, is generally equivalent to the mobile telephone switch office (MTSO) 23 used to control a plurality of AMPS base stations 21, 21' and 21". In the AMPS system, the MTSO 23 can be connected to the various base stations 21, 21', 21" by way of communication links, either over dedicated landlines or through a Public Switched Telephone Network (PSTN). Likewise, the connection between MD-IS 3 and the various mobile data base stations 1, 1', 1" controlled thereby is made in the same manner. However, different signaling protocols are used than those found in the AMPS system.

In comparison to AMPS, the infra-structure requirements of CDPD are very small. CDPD base station equipment is preferably located at a cellular carrier's cell site with existing AMPS base station cellular equipment. The multiple access nature of the CDPD system makes it possible to provide substantial CDPD coverage to many users simultaneously with the installation of only one CDPD radio in a given sector. This multiple access is the result of a mobile end-system accessing the CDPD channel only when there is data to be sent.

The AMPS base station and the MDBS can use the same RF equipment if both are co-located. By contrast, the MTSO of the AMPS system and the MD-IS of the CDPD system do not have to be co-located in order to share RF links. In the AMPS system, the MTSO 23 has the responsibility of connecting the AMPS base station and the mobile station to another party through a PSTN 24. The intermediate system 4 of the CDPD corresponds to the use of the PSTN by the AMPS system. Like the AMPS system, the CDPD system must also use the public switch telephone network or another landline network for completing calls to remote parties or systems via a phone system terminal network 28. However, the CDPD system employs a different protocol than that used by the AMPS system for completing calls over a PSTN.

The MDBS maintains a number (up to the MDBS transmission capability) of channel streams across the airlink interface, as directed by the MD-IS controlling that MDBS. The MDBS instructs all wireless subscriber stations to change channels when necessary such as when an AMPS communication is detected on the CDPD channel. Each wireless subscriber station's terminal stream is carried on one channel stream at a time, normally selected by the mobile subscriber, preferably based upon data received from the MDBS regarding optimum channels for CDPD use. The forward and reverse traffic in a given cell (the terminal stream of the MDBS) is carried on a single DS0 trunk, between the MDBS and the MD-IS. Communication between the MDBS and the MD-IS over the DS0 trunk follows standard formats such as T1.

Within the CDPD network, digital data is transmitted between the MDBS and the M-ES using Gaussian Minimum Shift Keying (GMSK) modulation. Transmissions from the base station to the wireless subscriber station M-ES are continuous. Those from wireless subscriber station M-ES to the MDBS use a burst mode in which wireless subscriber station M-ES accesses a channel only when it has data to send and the channel is not being used by other mobile wireless subscriber stations. This allows multiple mobile wireless subscriber stations to share a single channel, and for data transmission characterized by intermittent transactions of relatively small amounts of data, greatly reducing the connection time compared to that when sending digital data over conventional circuit-switched cellular modems.

Unlike the signaling schemes used in conventional cellular modems, which have been chosen based on the need to operate within the constraints of the existing voice signaling system, the GMSK modulation technique used for CDPD communication was explicitly selected with the intent of obtaining both very high bit transmission rates and good error performance in cellular channels. The fact that the choice of modulation was not constrained by a pre-existing signal structure allows CDPD systems to achieve substantially greater instantaneous bit rates at very low received signal levels when compared to those of conventional cellular modems. This means that CDPD communication systems will provide reliable, high speed data transmission in many areas where signal quality is inadequate for good cellular modem performance. Presently, the raw (baseband)

digital data being transferred across CDPD include electronic mail messages, digital fax data, or other digital data representing a network connection such that files may be transferred as if currently connected to a local area network.

The mobile data intermediate system MD-IS 3 handles the routing of packets for all visiting wireless subscriber stations in its serving area. Two services are performed by the MD-IS: a registration service maintaining an information base of each M-ES currently registered in a particular serving location; and a re-address service, decapsulating forwarded packets and routing them to the correct cell. The serving MD-IS also administers authentication, authorization and accounting services for the network support service applications.

A CDPD communication system can operate with dedicated channels set aside from the pool of cellular voice channels and reserved for CDPD use. In the alternative, in a more typical mode of operation, the CDPD communication system can use idle time on channels that may also be used by AMPS communications. In this second case, the mobile data base station may perform "RF sniffing" to determine which channels are available and detect the onset of voice traffic on the channel currently being used for CDPD communication. If an AMPS cellular unit begins transmitting on a channel occupied by a CDPD communication, the CDPD unit ceases transmitting on that channel and switches to another available channel (a process called "channel hopping") or if no other channel is available, ceases transmission until a channel becomes available for CDPD use.

Although the CDPD system shares existing AMPS radio frequency channels, AMPS calls are given first priority, and they are always able to preempt the use of any channel being used by CDPD. However, the cellular service provider may opt to dedicate one or more channels to CDPD usage. In this case, AMPS calls will never attempt to pre-empt the channels dedicated to CDPD use.

In normal operation, the MDBS will carry out channel hopping to avoid channels to be used for AMPS communications. To do this, the MDBS performs a monitor activity on AMPS channels, and maintains a list of the status (occupied by voice or unused) for each channel available for CDPD use at the cell. The MDBS selects a channel for CDPD use from the unused channels in the list based on a combination of criteria (not specified in the CDPD standard). These could include such considerations as the likelihood that the channel will be required by the voice system in the near future, the amount of interference present on the channel, the amount of interference that the CDPD communication is likely to cause to other voice users in different cells, or on other sectors, and other factors. The MDBS transmits a list of all channels available for CDPD use (whether currently occupied by a voice communication or not) to the wireless subscriber stations. The MDBS may execute a channel hop before the channel is pre-empted by AMPS communication if the MDBS determines that another channel is more suitable. In such a case, the MDBS sends a message to the wireless subscriber stations commanding them to change to the specific channel selected, and then the MDBS executes the hop. This sort of hop is much more orderly and efficient than an unplanned hop since the wireless subscriber stations do not have to search for the next channel.

If the present CDPD channel is pre-empted by AMPS communication, the MDBS selects another channel from those unused by AMPS communications and immediately hops to it without informing the wireless subscriber station (an unplanned hop). The wireless subscriber station then determines that the CDPD signal is no longer present on the current channel and searches the other channels in the list to determine the channel (if any) to which the CDPD communication has hopped.

The CDPD system has the capability of easily interfacing with the existing AMPS system and sharing some front-end equipment with it. To take advantage of this capability, the MDBS must have the capability of physically interfacing with existing AMPS base stations. Consequently, the MDBS should be small, non-obtrusive, and easily accessible without interrupting existing AMPS equipment. The MDBS has to be configured so as to easily be connectable to equipment outside the MDBS normally shared with the AMPS system. This external equipment found in the AMPS base station includes an antenna system, RF power amplifiers (in particular, linear amplifiers which can be shared with existing AMPS), RF multicouplers, power splitters, duplexers, and, optional equipment. Since the MDBS shares the environment of the AMPS base station, the MDBS should not constitute a substantial additional burden upon such support systems as environmental control and maintenance. Thus, the MDBS must be compact and flexible, constituting only those elements necessary for carrying out the MDBS functions necessary at that cell site.

FIG. 3 is a block diagram of a portable communication terminal handset 100. In most respects, this portable communication terminal is similar to conventional portable radio telephone handsets having a radio frequency module 102 with at least one radio frequency transceiver. The radio frequency transceiver uses a main antenna 104 for both receiving and transmitting the various types of signals handled by the portable terminal, such as AMPS data (circuit switched cellular data) communication, AMPS voice communication and CDPD communication. A diversity antenna 106 is used as a backup to maintain reception under certain adverse conditions. A telephone type handset 112 is used to facilitate AMPS voice communication.

The portable terminal can also be patched into a local public switch telephone network (PSTN) by way of a digital-analog access interface (DAA) connected to the radio control processor 108. This processor, along with control processor and modem 109, shares the various control functions of the portable terminal including call setup, high level protocol, low level protocol, power adjustment, modem operation and data transfer with an external host computer. To facilitate ease of subscriber use, the host computer can be a personal computer (PC) or personal digital assistant (PDA) or other electronic device. The connection hardware of the portable terminal is of a standard type normally used with PC external connectors.

The portable data terminal handset and wireless subscriber station depicted in FIG. 3 can be configured to permit all the modes of operation illustrated in FIG. 4 and described in patent application Ser. No. 08/117,913. The mode designated as 200 in FIG. 4 represents the menu mode selection by either the operator or programmer of the portable data terminal handset. Either of two modes (AMPS or CDPD) can be selected by an operator using a key pad on the handset. If data is being entered into the portable terminal (handset) 100 by a host computer, either the selected mode or a predetermined default setting can be selected as part of that data transfer.

Preferably, the system is normally in a low-power sleep mode. This sleep or dormant mode results in minimum power expenditure. Normally, the sleep mode will be interrupted every 10–255 seconds to check for messages such as incoming paging signals. If none are received, the CDPD mode remains idle. The CDPD can be rendered active as indicated by receipt of a paging signal, or a command from the host computer or handset user to initiate data transfer in the CDPD mode. An advantage of remaining in the CDPD mode is that the battery is not heavily burdened so that, based on current battery technology, talk time at full transmission power is greater than 1 hour and standby time while monitoring the AMPS control channel is greater than 12 hours.

Sleep mode procedures are used to place the handset in the sleep mode, which is defined as an optional mode of operation that might be requested by a wireless subscriber station M-ES during a data link establishment procedure (communication between the wireless subscriber station and mobile data intermediate system). The sleep mode is intended to assist power conservation strategies in the wireless subscriber station. The general operation of the sleep mode permits an M-ES to disable or power-down its receiver and associated circuitry. This mode is a key advantage of CDPD operation.

The sleep mode procedure operates in the "multiple frame established state". In this operation, if no frames are exchanged on the data link connection between a particular wireless subscriber station M-ES and the MDBS after a period of time defined by the parameter T203, the data link connection may be placed in the Temporary Equipment Identifier (TEI) sleep state for the handset. While in this state, the overall network will not attempt to transmit information destined for that M-ES. If, after entering the sleep state, new frames become extant and waiting initial transmission, the network will broadcast a predetermined message at periodic intervals. This message contains a list of TEI's for which channel data is pending. The wireless subscriber stations are expected to wake up at periodic intervals to determine if data from them is pending, and notify the network that they are willing to receive the pending data. Normally, the M-ES may exit the sleep state at any time.

Parameter T203 represents the maximum time allowed without frames being exchanged on the data link connection before the M-ES is expected to enter the CDPD sleep mode. On the user/subscriber (M-ES) side, timing of the parameter T203 is started or restarted upon transmission of a data link layer frame of any type on the reverse channel (from the M-ES to the MDBS). On the network side, the timing of parameter T203 for a particular M-ES is started or restarted upon receipt of a data link layer frame (of any type) on the CDPD channel. If the value of parameter T203 expires, the data link entity will enter the TEI sleep state, and issue an indication of this state from the user's side. The layer management entity may take power conserving measures, such as disabling the subscriber radio receiver or other non-essential portions of its circuitry.

A second parameter, T204, represents the time intervals at which the network side broadcasts TEI notification of pending data for a sleeping M-ES. A single timing operation for parameter T204 is maintained for a channel stream; all user side management entities discover and synchronize to particular channel streams T204, via the TEI notification procedure described in Section 6.8.8 of Part 403 of the CDPD specification. The number of frames queued in the maximum time for which the network attempts to notify an M-ES in the TEI sleep state is implementation dependent. The network releases a data link connection and discards all queued frames for which the TEI sleep notification procedures are aborted. The maximum number of attempts to notify an M-ES in the TEI sleep state of pending network transmissions is designated system parameter N204. The network normally aborts a TEI sleep notification procedure for a TEI which has been included in a number expressed as parameter N204, of successive TEI notification messages without a response from that M-ES. Consequently, M-ES will be de-registered with the CDPD system.

A complete description of the aforementioned operation is found in Section 6.8 of Part 403 of the CDPD specification. The parallel operation of M-ES and the MD-IS is depicted in the flow charts of FIG. 5. Both units recognize when the last CDPD communication by a particular subscriber at an M-ES has taken place. In this respect, both the M-ES and the MD-IS can be synchronized to each other. Using internal clocks, both units keep track of the time elapsed since elapse of the most recent CDPD communication between the M-ES and the MD-IS, as indicated at step 702. Thus, in operation according to this Part of the CDPD specification, if no data is sent in either direction over the air link for a certain length of time (parameter T203), the M-ES will go into the sleep mode and the network will assume that the M-ES is asleep, as indicated at step 703. Once the M-ES enters the sleep mode another timing operation is carried out in both the M-ES and the MD-IS.

The total length of this period is defined by the product of parameters T204 and N204, previously described. If the network has data to deliver to the M-ES that is believed to be asleep, the network will add the TEI for that M-ES to a list of sleeping units on a particular channel stream, that have data waiting for them. However, the network will not send that data (step 704). For each time frame measured by the parameter T204, the network will send a TEI indication for a particular wireless subscriber station M-ES indicating that there is data waiting for that wireless subscriber station. Thus, the wireless subscriber station will have to be monitoring the CDPD channel at some time during the time frame defined by T204 in order to determine if a message is waiting for that wireless subscriber station.

The list of wireless subscriber stations having waiting messages is broadcast to all stations on that channel stream periodically in a TEI notification message. The time between such notification is specified by the parameter T204. This parameter determines the length of time the M-ES is expected to sleep before waking for its messages. When the M-ES awakens, it waits until it receives a notification message. If the TEI of that M-ES is on the list, it notifies the network that it is ready to receive data. If the TEI of a particular M-ES is not on that list, that M-ES goes back to sleep for another period of time, normally specified by the parameter T204. If a consecutive number of notifications (specified by the parameter N204) have been made for a TEI without the subject M-ES indicating that it is ready to receive data, the network will then assume that the M-ES is no longer present on the CDPD system and discards the data that was pending for that M-ES, as indicated at step 705.

If the particular M-ES is handling normal AMPS communication for a greater amount of time than that encompassed by the product of parameters N204 and T204, then the data being held for that M-ES is discarded by the network. Thus, CDPD communication is lost due to the normal operation of AMPS communication. Thus, it is necessary that the subscriber station M-ES remain tune to the CDPD channel long enough to monitor for its TEI. This entails additional time in the awake state, and as a result, additional battery drain.

Since AMPS mode operation is recognized as having preference over CDPD mode operation, the handset preferably spends most of its time monitoring for AMPS communication and just enough time in the CDPD mode to pick up indication of messages for a wireless subscriber station and avoid de-registration. One mode of operating a wireless subscriber station M-ES involves remaining in the AMPS mode monitoring an AMPS control channel while periodically breaking away to poll the CDPD network. When breaking away from the AMPS mode, the wireless subscriber station M-ES sends a polling signal to the CDPD network to evoke a response and determine if there is any data waiting on the CDPD network for transmission to that wireless subscriber station. After listening for an appropriate amount of time (usually T203) after the response for a return message from the CDPD network, the wireless subscriber station then switches modes and tunes back to the AMPS channel. Preferably this switch-over occurs before any re-transmission of relevant AMPS pages that might have been missed while the wireless subscriber station was in the CDPD mode.

The natural result of the foregoing operation is that a wireless subscriber station is required to remain in a relatively high-power state in order to receive the aforementioned messages. Consequently, power consumption in the wireless subscriber station will be quite high, and battery life shortened. This is a critical factor in the operation of a wireless subscriber station.

To counter this shortcoming, it is necessary to minimize the time that a wireless subscribe station will be listening for its Temporary Equipment Identifier (TEI), or any other control messages transmitted from either the MD-IS or the MDBS to control the operation of the wireless subscriber station.

One significant factor contributing to the time a wireless subscriber station must remain in a high power state to receive TEI messages is the lack of predictability (on the part of the wireless subscriber station) with respect to times at which the TEI signals are broadcast. As a result, wireless subscriber stations must waste time and power during long communications cycles in order to wait for the transmission of the TEI signals. This is also true for the other necessary control signals. While the timing of the TEI signals is regular and predictable at the Mobile Data Link Protocol (MDLP) layer as described in Part 403 of the Cellular Digital Packet Data Specification, Version 1.1, such predictability is not translated into the Medium Access Control (MAC) layer described in Part 402 of the Cellular Digital Packet Data Specification. This is critical since it is the MAC layer which ultimately controls the timing between the MDBS and wireless subscriber stations.

Factors which contribute to this uncertainty include:
(i) propagation delays through processing elements;
(ii) queuing delays on the backhaul network (writing delays); and
(iii) queuing delays at the base station. While these factors cannot be assessed directly, operational experience in CDPD systems indicates that these delays create an uncertainty of about plus/minus three seconds. As a result, the wireless subscriber station must be awake for approximately sixty blocks or frames of message flow time (where each block is approximately 50 milliseconds) as well as an additional three blocks of times needed to process the appropriate TEI notification once it appears. This is a substantial amount of time in the operation of any wireless device, especially significant in light of the fact that only three frames are necessary to process the appropriate TEI notification once it appears. Thus, conventional operation requires approximately 2100% ($63/3$ times 100) more time in the high-power awake mode than is really necessary.

Another problem in the conventional use of CDPD systems is that additional monitoring is necessary by the wireless subscriber station to receive control messages other than the TEI message. These include:
(i) channel configuration messages which provide information by channels used in neighboring cells that is needed to perform cell transfers;
(ii) channel identification messages which provide timing information, parameters for the control of the MAC layer, and other identifying parameters about the channeling use by the subscriber;
(iii) channel access parameters;
(iv) the switch channels message which is used to control subscribers to switch to another channel; and
(v) the alternative services provider message which informs subscriber of other services providers that may be available.

Normally, these messages are distributed on quasi-regular intervals, and are subject to queuing delays at the MDLP level. There are also internal propagation delays at the MDBS. The additional monitoring time for the wireless subscriber station is necessary since these messages are needed in order to gain access to the network when the mobile wireless subscriber station enters a new cell. Thus, a wireless subscriber station must listen continuously until it receives all of the aforementioned control messages. Typically, the amount of time required is approximately five to ten seconds. Thus, the amount of time spent monitoring for these control messages is far greater than the time necessary (typically a few blocks each of approximately 50 milliseconds) to receiving and process the control messages.

In order to increase battery life in a wireless mobile wireless subscriber station, it is necessary to substantially reduce the time during which the wireless subscriber station must monitor the CDPD channel to receive TEI and other necessary control messages. However, a major problem exists in that all of the aforementioned control messages are necessary for the operation of a wireless subscriber station in the CDPD mode.

An additional source of power expenditure is found in the decoding operation of the Forward Error Correction (FEC) blocks. As in any digital system, error correction is necessary in CDPD communication. The basic unit of transmission on the CDPD channel stream is a fixed length error control block of 278 bits. The transmission consists of a burst containing an integral number of blocks, interleaved with the various control flags and synchronization words as detailed in the respective sections of the CDPD specification addressing forward channel formatting and reverse channel formatting.

Each block is encoded using a systematic Reed-Solomon error correcting code as shown in FIG. 8 (taken from FIG. 402-4, Part 402, Section 4.31 of the CDPD specification, Version 1.1). This encoding is based upon a (63,47) Reed-Solomon code generated over the Galois field GF (64). The code word is based on 6-bit symbols. The information field consists of 47 6-bit symbols (two-way 2-bits) and the generated parity field consists of 16 6-bit symbols. Thus, the 282 bits are encoded into a block of 378 bits. This (63,47) Reed-Solomon encoding is common to both the forward channel and the reverse channel in CDPD communication. In normal CDPD, a considerable amount of time and energy is expended decoding the FEC blocks.

BRIEF SUMMARY OF THE INVENTION

The first advantage of the present invention is in using the capability of predicting transmission time for control messages to further reduce power expenditure for CDPD subscriber stations.

Another advantage of the present invention is in reduced monitoring time on a CDPD channel for a wireless subscriber station operating on a CDPD system.

Still another advantage of the present invention is increased reliability in the monitoring of control messages.

A further advantage of the present invention is in the avoidance of expending time and energy decoding FEC blocks.

These and other advantages of the present invention are achieved by a method of operating a wireless subscriber station in a wireless communication system to limit power expenditure in the wireless subscriber station. The wireless communication system includes at least one base station for transmitting a communication stream of message blocks to a plurality of wireless subscriber stations. The method includes the steps of monitoring the communication stream for Temporary Equipment Identifier (TEI) message blocks where the TEI message blocks include TEI messages and a plurality of Forward Error Correction (FEC) bits. The method also includes the step of determining a Base Error Rate (BER). The method further includes the step of decoding the FEC bits only when the BER is above a predetermined level.

A second aspect of the present invention includes a method of communicating between a base station and a plurality of wireless subscriber stations in a wireless communication system. Whereas the base station controls a stream of message blocks including a plurality of TEI messages corresponding to respective ones of a plurality of the subscriber stations. The method includes the steps of arranging all the TEI messages in a continuous group and beginning the group of TEI messages with a unique TEI message and ending the group of TEI messages with a second unique TEI message. The unique TEI messages differ from all other TEI messages by at least six characters.

DETAILED DESCRIPTION OF PREFERRED EMBODIMENTS

Figure 6:
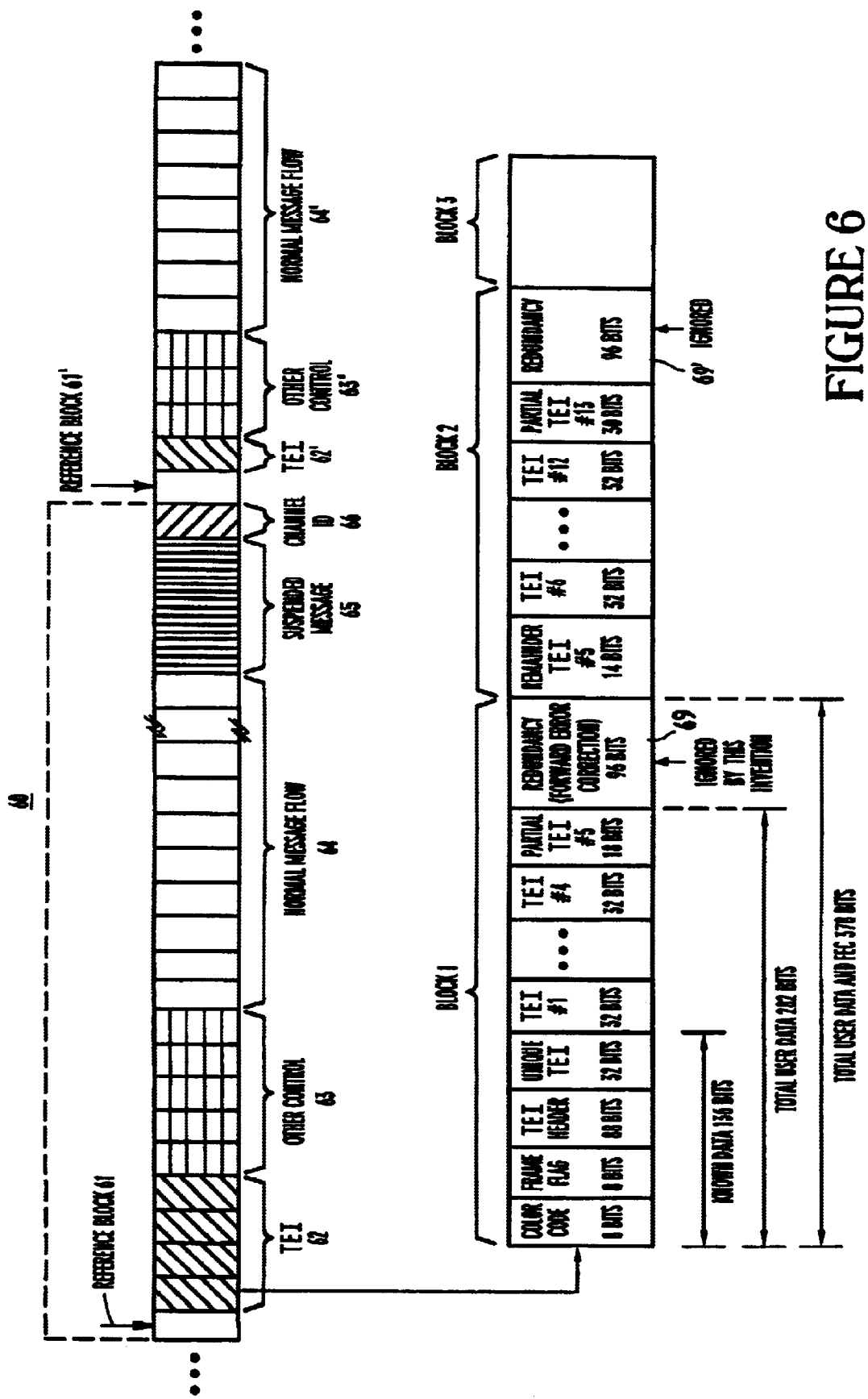
FIG. 6 is a diagram depicting the message block arrangement used in a method of predicting control message transmission times including the constitution of the message blocks.

FIG. 6 is a time flow diagram depicting an arrangement of message blocks that facilitates increased battery life through decreased power usage, in accord with the invention. As with most CDPD control functions, the timing arrangement depicted in FIG. 6 is generated in the MD-IS using a mobile data link protocol (MDLP) described in Part 403 of the CDPD specification, Version 1.1. As previously discussed, manipulations and time adjustments at the MDLP level are inadequate to achieve acceptable reliability due to variations at the medium access control (MAC) level (as described in Part 402 of the CDPD specification, Version 1.1). Consequently, the approach described below is used to overcome this drawback.

The present invention applies to the two-way paging variation of the CDPD system, as well as the conventional version. The two-way paging variation is essentially the same as a standard CDPD system but with a number of variations to allow two-way paging as described below. The two-way paging variation of CDPD can share channels with AMPS communications as with the standard CDPD system. However, the two-way paging variation is not limited to sharing AMPS channels, and can be used with dedicated channels outside of the AMPS band range.

In the operation of the two-way paging variation, the channel identification message must be acquired by the subscriber station before it can initiate the registration procedures normally carried out as defined in Part 407 of the CDPD specification. This is done by the subscriber station monitoring for an indeterminate amount of time. Further, the subscriber station must acquire the channel identification message after completing a cell transfer as is done in normal CDPD operation (although transmission can take place on a new channel prior to receipt of the channel identification message under certain circumstances). This acquisition is preferably completed in time to allow the subscriber station to take steps to prevent the MD-IS (3 in FIG. 1) from initiating re-transmission on the old channel stream using MDLP.

Also, since the channel identification message contains the epoch or segment length for the current epoch, on initial acquisition, the subscriber station must use the channel identification message to provide the definition of the epoch structure for the RF network as well as for the cell being acquired. Normally, the TEI notification message is transmitted starting in the first data bearing block of the forward channel time slot upon expiration of a counter (designated N210) dedicated to the timing of TEI notification messages. All the cell configuration, cell access parameters and alternative identifier messages are transmitted immediately after the transmission of each TEI notification message in the aforementioned order. If necessary, the base station (MDBS 1 in FIG. 1) may transmit multiple cell configuration messages before the channel access parameters and the alternative service identifier messages are transmitted. When switched channel messages are required, they are transmitted immediately after the TEI notification message and before the cell configuration messages. This arrangement of TEI and other control messages facilitates one aspect of the present invention as described, infra.

The timing arrangement depicted in FIG. 6 permits timing reliability despite variations in the MAC layer queuing and timing. This is done by permitting the MAC layer and the wireless subscriber station to anticipate the position of TEI and other control messages in the overall message flow. In order for such predictability to occur, it is necessary to divide the communication message flow into a number segments 60 such as that depicted in FIG. 6. Each epoch will have a reference block 61 that identifies the beginning of the epoch. Thus, the message flow is divided into a series of epochs such as 60, each one beginning with a reference block 61, 61', 61", . . . . Preferably, each epoch is established with a uniform number of blocks. As described below, the duration of epochs must be an integer number of Reed-Solomon blocks (the Reed-Solomon blocks as defined in the CDPD specification). This number can be adjusted by the CDPD system provider based upon traffic levels and other system requirements.

Normally, the MAC layer does not read the messages of the MDLP entity. Consequently, in accord with this invention, a standard is established that the MAC layer will recognize defining a reference block 61 for every epoch 60 of N message blocks. The position of each reference frame is chosen to coincide with an external time standard such as the global positioning system (GPS), although other timing standards can be used. Significantly, the wireless subscriber station is able to coordinate with this timing standard to move into the awake mode to receive the TEI messages and any other necessary control messages and then immediately go back into the sleep mode if a TEI message directed to that wireless subscriber station is not found.

The timing information for coordinating with a standard by the wireless subscriber station is conveyed to the wireless subscriber station via the channel identification message frame 66. The channel identification message contains the time of day for the occurrence of the proceeding reference block. This frame provides timing information, parameters for the control of the MAC layer and other identifying parameters about the channel in use, as described in Part 402 of the CDPD specification, Version 1.1.

In order to predict precisely when the TEI messages, as well as other control messages, will occur in the communications flow, it is also necessary to know exactly where the subject messages will occur with respect to the reference block 61. The positioning of the TEI messages 62 and other necessary control messages 63 are known both to the MAC layer and to wireless subscriber stations based upon a set of parameters configured at "start-up" (when wireless subscriber station first registers with the CDPD system).

In order for the present invention to maintain its necessary predictability, the local timing standard or reference must maintain an accuracy of plus/minus twenty milliseconds with respect to an external absolute time reference. If the MDBS cannot guarantee that the local time reference is within plus/minus twenty milliseconds of the external absolute reference, the mobile data base station will normally cease to transmit.

The mobile data base station can use two sources as external absolute time references: a GPS receiver; or an NTP time server based upon a GPS reference. To predict the beginning of a TEI message transmission, it is necessary to ascertain both the duration of an epoch (e.g., epoch 60 of FIG. 6) and the starting time of the epoch. A parameter designated as N212 is used to define the duration of an epoch. Preferably, the value of N212 is pre-defined and assigned by the NMS. The starting time of the epoch, which is also the starting time of the reference block (e.g., reference block 61), is determined by the base station by calculating the number of epochs that have occurred since some absolute beginning reference (e.g., Oh 1995). Both the starting time and the duration of the epoch are conveyed to the subscriber station via the channel identification message located at the end of the epoch currently being received by the subscriber station.

Preferably, the mobile data base station and subscriber stations may utilize N212 counters to maintain synchronization with the forward channel transmission window. The N212 counter is set to the duration of the forward transmission window in units of eight times the Reed-Solomon block duration. The duration of the forward channel transmission frame is defined by the NMS (10 in FIG. 1), and is communicated to the mobile data base station. The parameter is communicated also to the subscriber stations via the channel identification message as previously described. It is necessary that the mobile data base station transmission window maintains strict time alignment with the local mobile data base station clock. Otherwise, it would be impossible to maintain the predictability of the TEI message transmissions.

Figure 7:
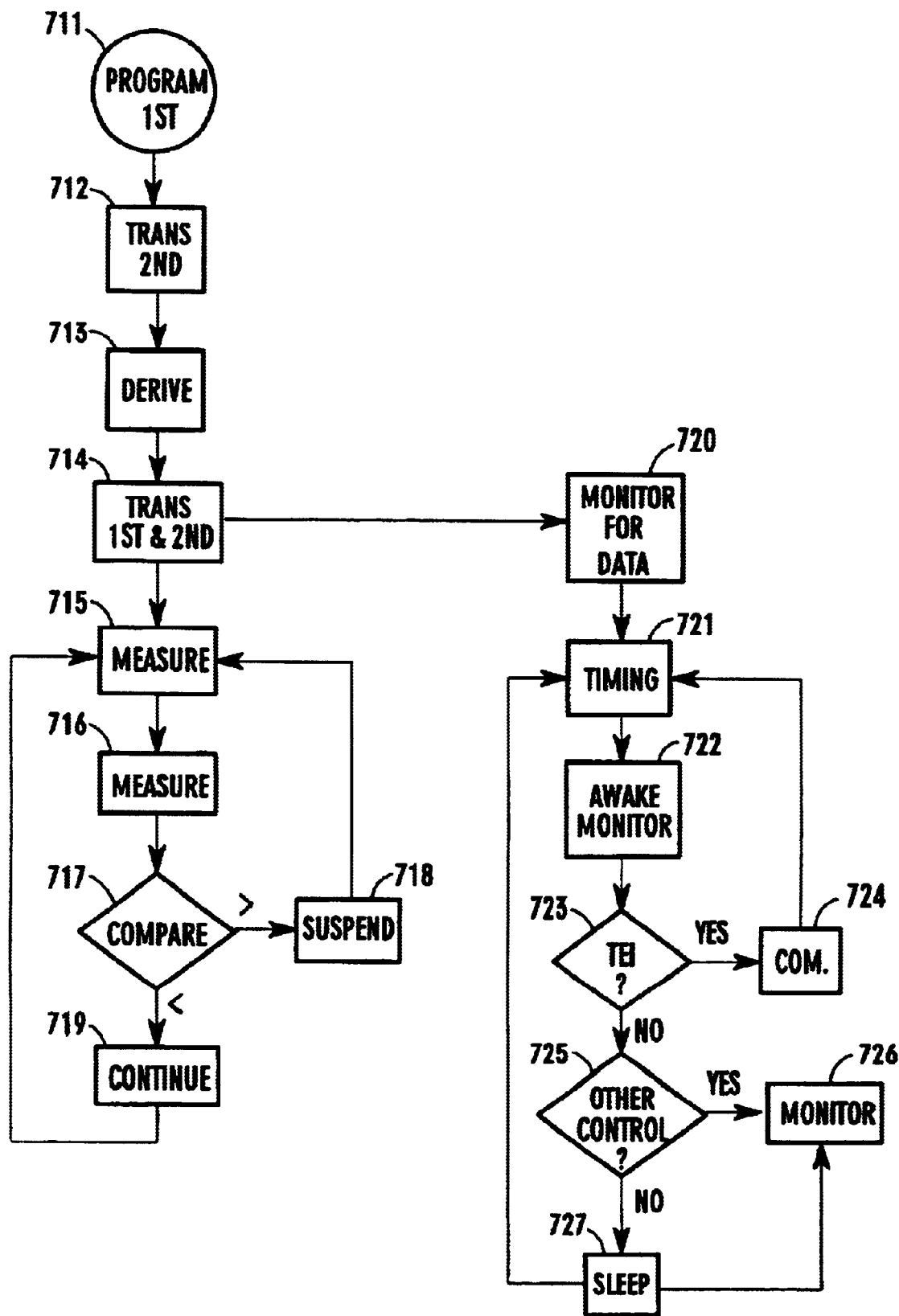
FIG. 7 is a flow diagram depicting the sequence of operation of a system using the data arrangement of FIG. 6.
Figure 8:
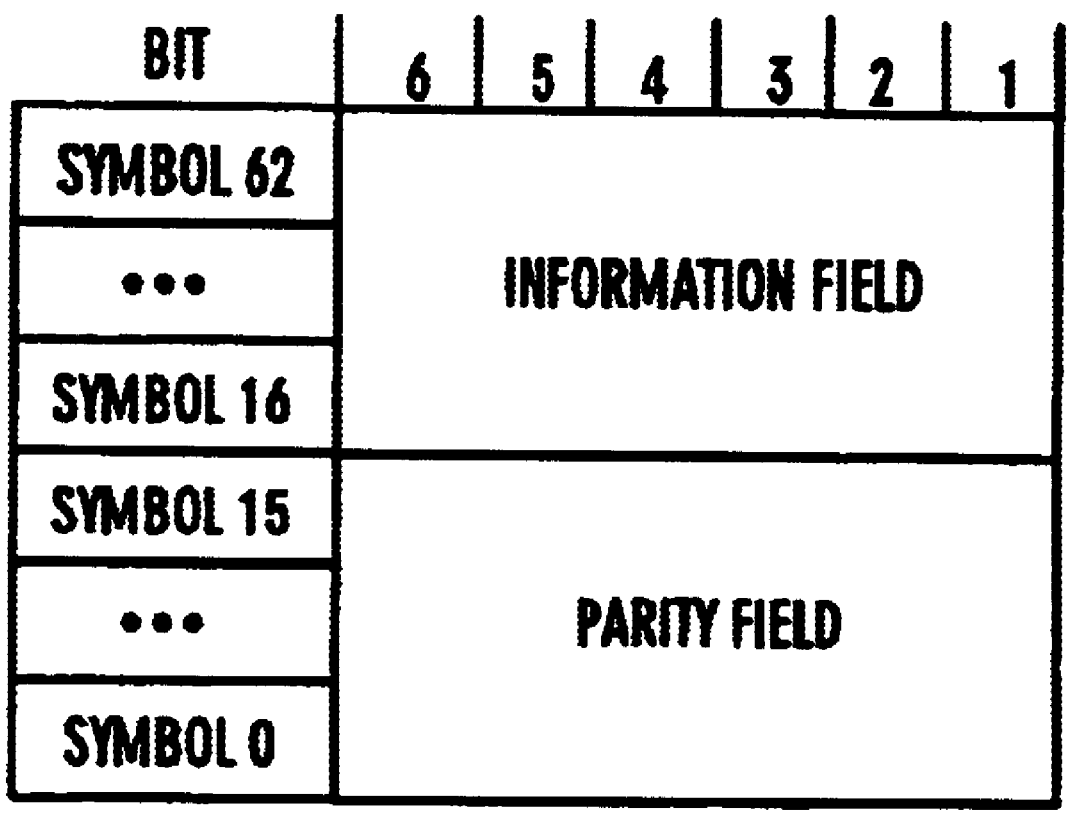
FIG. 8 is a diagram depicting the arrangement of an FEC block.

FIG. 7 depicts the operation of both the CDPD system and the subscriber stations. The TEI and other control message positions are programmed into the Mobile Data Base Station (MDBS 1 in FIG. 1) when the MDBS is placed on-line at step 711. At step 712, the CDPD system (MD-IS in FIG. 1) sends the exact interval at which the TEI notification message shall be sent. This second timing data is imbedded in TEI messages sent from the MD-IS to the MDBS. At step 713, the MDBS reads the TEI messages to obtain the second timing data. Information for the first timing data (including the epoch or segment length and the control message positioning data) is embedded in the channel identification message 66, as indicated at step 714. (Note—the second timing data is transmitted to the subscriber stations in the TEI overhead messages.) This data is broadcast to the subscriber stations (M-ES 2 in FIG. 1) based upon the timing represented in the message block sequence of FIG. 6.

In order for a subscriber to obtain all the necessary control messages to operate within a new cell, as well as the TEI timing data, the subscriber station monitors the CDPD channel in the awake mode until all of the control messages have been received (step 720). The subscriber station also coordinates with the external time standard at this step. Typically, this will take approximately five to ten seconds. Once the timing standard relating the reference block and TEI messages to the timing standard have been received by a subscriber station, the subscriber station can go into the sleep mode until approximately one block or frame of time before the predicted transmission of the TEI messages. While acquisition of this timing data requires continuous monitoring, it is required only once, no matter which cell the subscriber moves into. The time saved by grouping all of the other control messages next to the TEI messages is approximately five seconds. This is time that the subscriber station does not have to spend in the awake mode, and over the life time of the subscriber station adds up to a considerable savings in battery life.

A subscriber station (M-ES 2 in FIG. 1) must time the arrival of the next reference block (step 721) based upon the first and second timing data and input from the external timing standard, such as a GPS. Consequently, even if the subscriber station had been in the sleep mode, it must go into the awake mode in synchronization with the occurrence of the reference block 61, as indicated at step 722. At step 723, the subscriber station goes through a detection operation to determine if a TEI specific to that subscriber station is being broadcast. If so, the subscriber station begins a communication operation at step 724. If, however, no TEI specific to that subscriber station has been detected, the next step of the process (725) is carried out. This step includes a determination if additional control messages are needed for the operation of the subscriber station. Normally, such acquisition has to be carried out only once, and is done at the time that the subscriber station first registers with the MDBS. However, under certain circumstances, it may be necessary for the subscriber station to re-acquire certain control messages. If such a necessity exists, the subscriber station operates, as indicated at step 726, to remain awake to monitor control messages 63. If, on the other hand, the additional control messages do not have to be re-acquired, the subscriber station is able to move into the sleep mode immediately after reception of TEI messages 62, as indicated at step 727. The timing process depicted at step 721 continues to predict the next occurrence of a reference block for a subsequent segment or epoch identical in length to segment 60.

Once wireless subscriber stations have established coordination with an external timing device so that precise transmission time of reference block 61 is known, wireless subscriber stations would remain in the awake mode to monitor for TEI messages only during the time that such necessary control messages are transmitted. Afterwards, wireless subscriber stations immediately revert to the sleep mode if no TEI messages 62 directed to those wireless subscriber stations had been received. This is made possible by the fact that the wireless subscriber stations already "know" the exact number of blocks between TEI messages and the maximum duration of those messages.

Another advantage of this level of predictability of the control message blocks is that other control messages 63 (channel configuration, channel access parameters, cell configuration, switched channels, alternate service providers, etc.) can be received by a wireless subscriber station without undue lost time in the awake mode. This is accomplished by arranging all the control message blocks together on a predictable basis. As illustrated in FIG. 6, the other control messages 63 are arranged immediately subsequent to the TEI messages. However, other arrangements for the TEI messages can be found.

The channel identification message 66 is of necessity located in a different position. However, because of the precise frame arrangement of the present invention, this location is easily predictable by both the MAC layer and wireless subscriber stations. Thus, a wireless subscriber station need not waste time in the awake mode waiting for the occurrence of the channel identification block 66. The location of the channel identification block 66 is of particular importance since the timing information (with respect to the external time standard) is embedded in the channel identification message.

In order to maintain the predictability resulting from the present invention, normal message flow 64 is controlled so as to maintain the uniformity of the segment or epoch length 60. A constant measurement process (step 715) is carried out to measure the time between a current message flow block 64 and the next reference block 61'. This value is compared at step 717 to the length of the message to be sent (as measure at step 716). If the message to be sent is longer than the time remaining in the existing segment, the message is suspended and dummy data 65 inserted until the upcoming channel identification frame 66 is indicated at step 718. The message is resumed once more in normal message flow 64' after the transmission of TEI messages 62' and the other control messages 63'. If, on the other hand, the remaining portion of the normal message flow 64 would fit into the space existing before the occurrence of the next reference block 61', normal message flow is carried out as indicated at step 719. This timing operation is carried out for each portion of normal message flow handled by the MDBS 3. Consequently, any normal communications message identified as being too long for the remaining space in a segment or epoch such as 60, will be suspended and re-transmitted in the next segment.

A variation of the present invention accommodates a specific block or frame assigned to each subscriber station serviced by a particular MDBS. This is accomplished by the MD-IS sending each subscriber station a message before that subscriber station would go into the sleep mode. The message includes the exact location of the TEI message for that subscriber. Since the vast majority of subscriber stations or pagers are not being paged at any given time, the notification message for a particular subscriber is padded with many "dummy" values to fill up the space between other TEI messages.

Other techniques can also be used to limit battery expenditure in subscriber stations. FIG. 6 also depicts the breakdown of the TEI block 62. The configurations labelled block 1 and 2 in FIG. 6 are well known arrangements in accordance with the CDPD specification. A special note is the Forward Error Correction (FEC) bits labelled 69 and 69' in blocks 1 and 2, respectively. In each block of 378 bits, the redundancy segment for the FEC takes up a substantial portion of the block. The relative time and energy expended in reading and decoding the FEC bits constitutes a substantial expenditure of battery resources in a mobile subscriber station. However, because of the possibility of errors, the FEC bits have always been considered necessary in the operation of the CDPD system. Nonetheless, if the necessity of decoding the FEC bits could be removed, a great deal of time and energy would be saved, and the battery life of the wireless subscriber station would be prolonged.

The necessity of decoding the FEC blocks is avoided in another embodiment of the present invention by virtue of obtaining a significant hamming distance between the starting unique TEI for the message block 62 (immediately following reference block 61) and other TEI message blocks in group 62. The last block in the group of TEI messages 62 is also given a unique configuration. Thus, the unique TEI values are clearly distinguished from the other TEI values so that one source of errors is eliminated.

In order for the invention to work, even with the unique configurations of the starting and ending TEI blocks in segment 62 (FIG. 6), it is necessary that the occurrence of unique TEI blocks be predictable. One way of achieving this is by the technique described, supra. However, other prediction techniques could be used to carry out this embodiment of the present invention so that this embodiment is not constrained by the previously described techniques. It is noted that without capability of predicting the transmission time of the starting unique TEI, elimination of the FEC decoding operation by subscriber stations would not be practical.

As previously stated, this embodiment of present invention utilizes a significant hamming distance between the unique beginning and ending TEIs and other ordinary TEI messages. However, this is not necessarily true between the ordinary TEI messages. The hamming distance is a measure of the number of bits that are different between any two TEIs. Since the TEIs contain 32 bits, this embodiment relies upon a minimum of 6-bits of difference as constituting an appropriate hamming distance. This means that a unique TEI message will differ from any ordinary TEI message in at least six different positions out of the thirty-two total positions. The result of this is that a substantial number of TEIs out of a possible number of combinations of $2^{32}$ would normally be disallowed in order to ensure that the relationship of a 6-bit hamming difference will be maintained.

However, in this embodiment, the TEI arrangements are assigned on a random basis so that it is very unlikely that any two TEIs having a hamming distance closer than six would be in the same cell site at any one time. This operation is controlled by random assignment algorithm which also checks hamming distance. Should a unique TEI message have insufficient hamming distance from ordinary TEI messages, the MD-IS (1 in FIG. 1) can detect this condition and optionally re-assign the TEI of one of the subscriber stations in that cell. This combined with the guaranteed hamming distance from the unique TEI value, combined with the random TEI assignment discussed above, make the decoding of the FEC blocks of the TEI notification message unnecessary.

Once the FEC blocks are no longer decoded by a subscriber station, a problem arises in that errors may go undetected despite the high probability that a sufficient hamming distance will be maintained. One technique for determining errors without decoding the FEC blocks is to measure the base error rate (BER) using bits that are already known to the subscriber station before receiving the messages to be checked. Approximately one-eighth of the bits are already known since they are transmitted to subscriber stations in the TEI overhead messages.

By comparing the known bits with bits received it is possible to obtaining an underlying BER. If the subscriber station determines that the BER is high, then the subscriber station can compare the BER with a predetermined threshold and determine if the time and energy to decode the FEC is necessary. Once the subscriber station decides to decode the FEC, it is ensured that no errors will interfere with the scanning process unless the message cannot be decoded. The process of checking the BER is facilitated by the fact that the distance between the unique TEI of each consecutive epoch or segment (60 in FIG. 6) is already known as described, supra, with respect to the technique for predicting the beginning of TEI messages.

Since the scanning is done on undecoded blocks when the BER is at an acceptable level, it is necessary that the subscriber station know exactly where the boundaries of TEI messages are. Thus, it is extremely important that the HDLC zero insertion function be suspended because this operation would move the expected boundary position of the TEI messages. Also, the HDLC zero insertion function would also undermine the requirement that all TEIs be of a consistent number of bytes. The HDLC frame requirements are well documented in the industry, and are further discussed in Part 402 of the CDPD specification, Version 1.1.

One aspect of the HDLC frame requirement is the "zero stuffing" technique. Zero stuffing is the insertion of a "0" after five consecutive "1". This is normally used to distinguish the data from the frame delimiter sequence of "01111110". Normally the receiving station or subscriber station would remove the stuffed zeros. However, with this embodiment of the present invention, the stuffed zeros cannot be reliably detected or removed before scanning takes place without decoding the FEC blocks. Thus, it is necessary that the zero stuffing technique for HDLC framing not be used with the present invention in order to avoid this problem.

If channel errors occur, the subscriber station might mistake a normal TEI for the unique beginning or ending TEI. Only six errors are needed for this to occur with the present system. While this is an unlikely event, if it does happen, it will correct itself on the next notification interval, or epoch. While there is some chance that the error will be repeated in the next notification interval, this is very unlikely.

There is also some probability that a subscriber station will mistake the TEI of another subscriber station for its own. This can be caused by scanning errors and the fact that a minimum hamming distance may not be entirely guaranteed using the aforementioned random assignment algorithm. This is not a severe problem. However, if the system operator wishes to decrease the probability of this event occurring, then an additional operation can be employed. Using this operation, the MD-IS (3 in FIG. 1) can detect when two or more TEIs have a hamming distance less than six, and are in the same service area. Once this is detected, the MD-IS can re-assign at least one of the TEIs to effect a better hamming distance.

The problem of missing the closing unique TEI is far less severe since the subscriber station already knows the maximum length for the TEI message segment 62 (FIG. 6). If the unique ending TEI is not found, based upon the known timing, the subscriber station will simply abandon the search and continue a timing operation to predict the transmission time for the reference block 61' which begins the next segment or epoch. From this timing operation, occurrence of the next unique TEI message (in block group 62') can be predicted.

Figure 1:
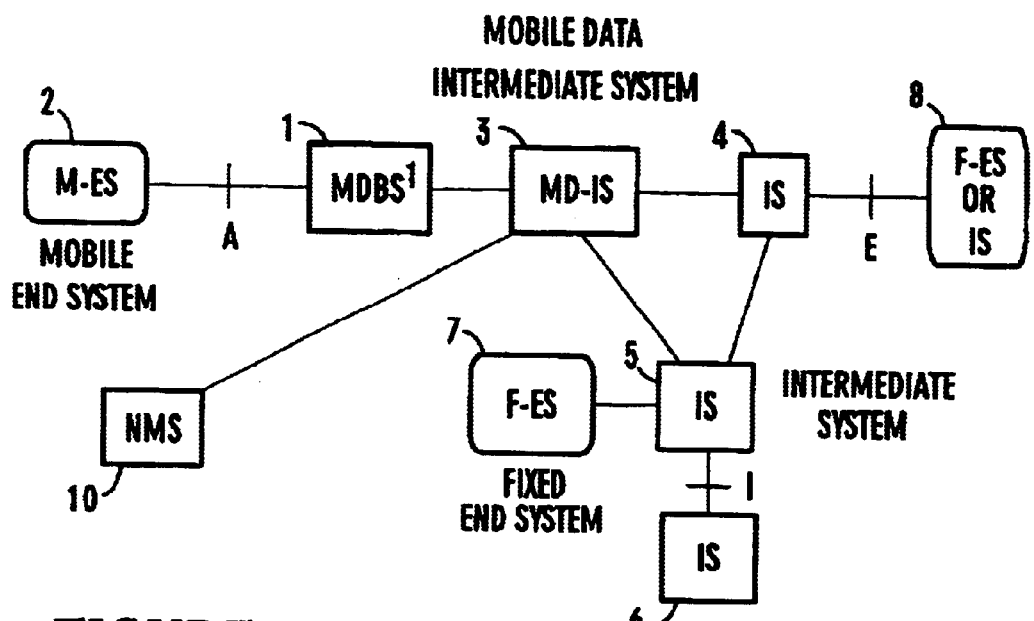
FIG. 1 is a block diagram of a conventional CDPD system.
Figure 3:
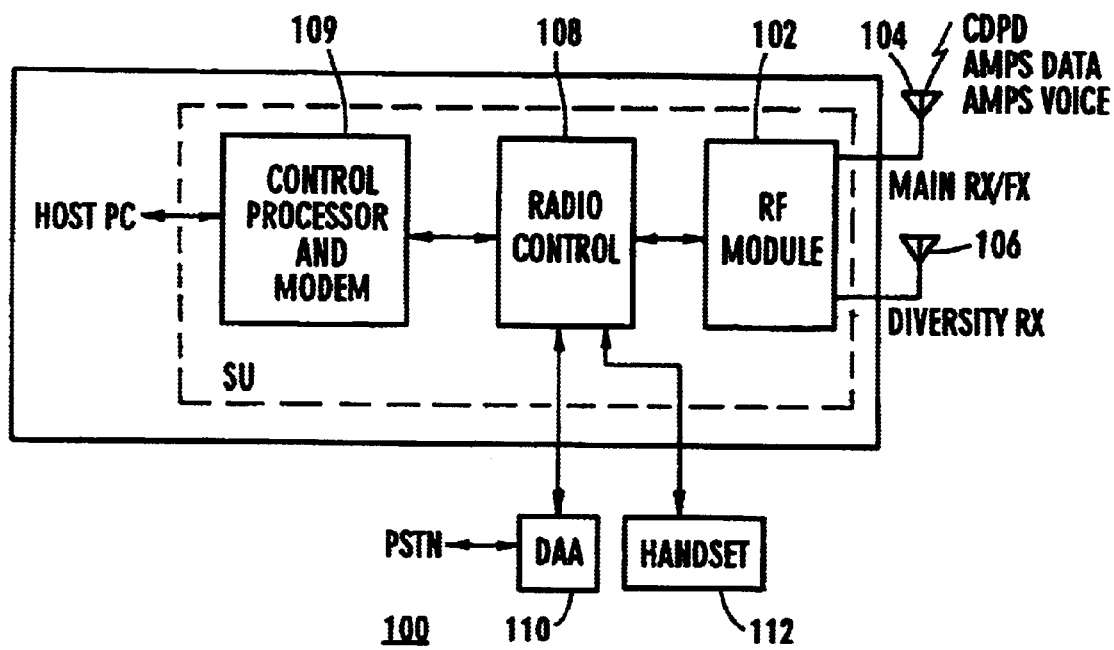
FIG. 3 is a block diagram of a portable radio telephone handset.
Figure 2:
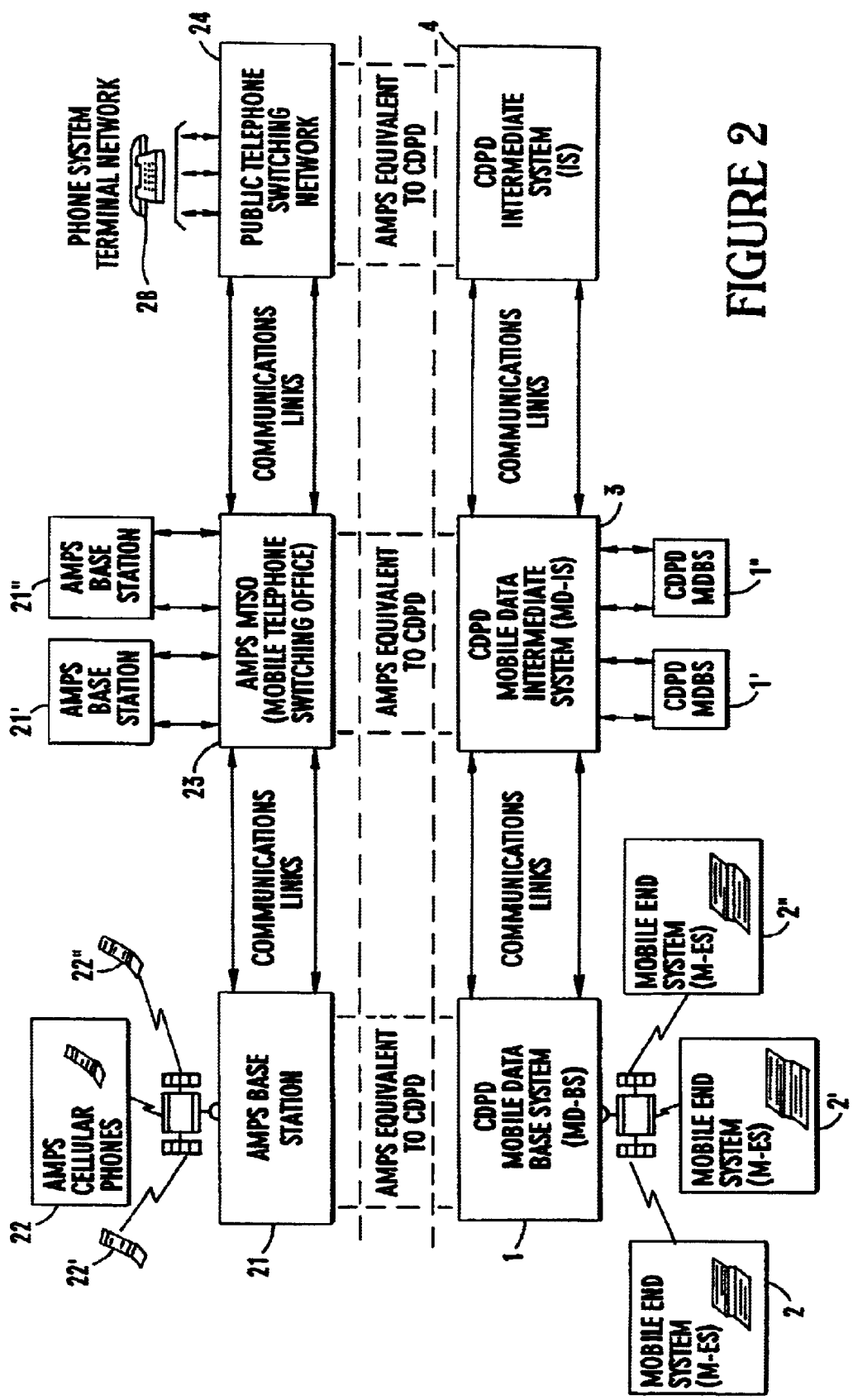
FIG. 2 is a block diagram correlating the CDPD system to a conventional AMPS system.
Figure 4:
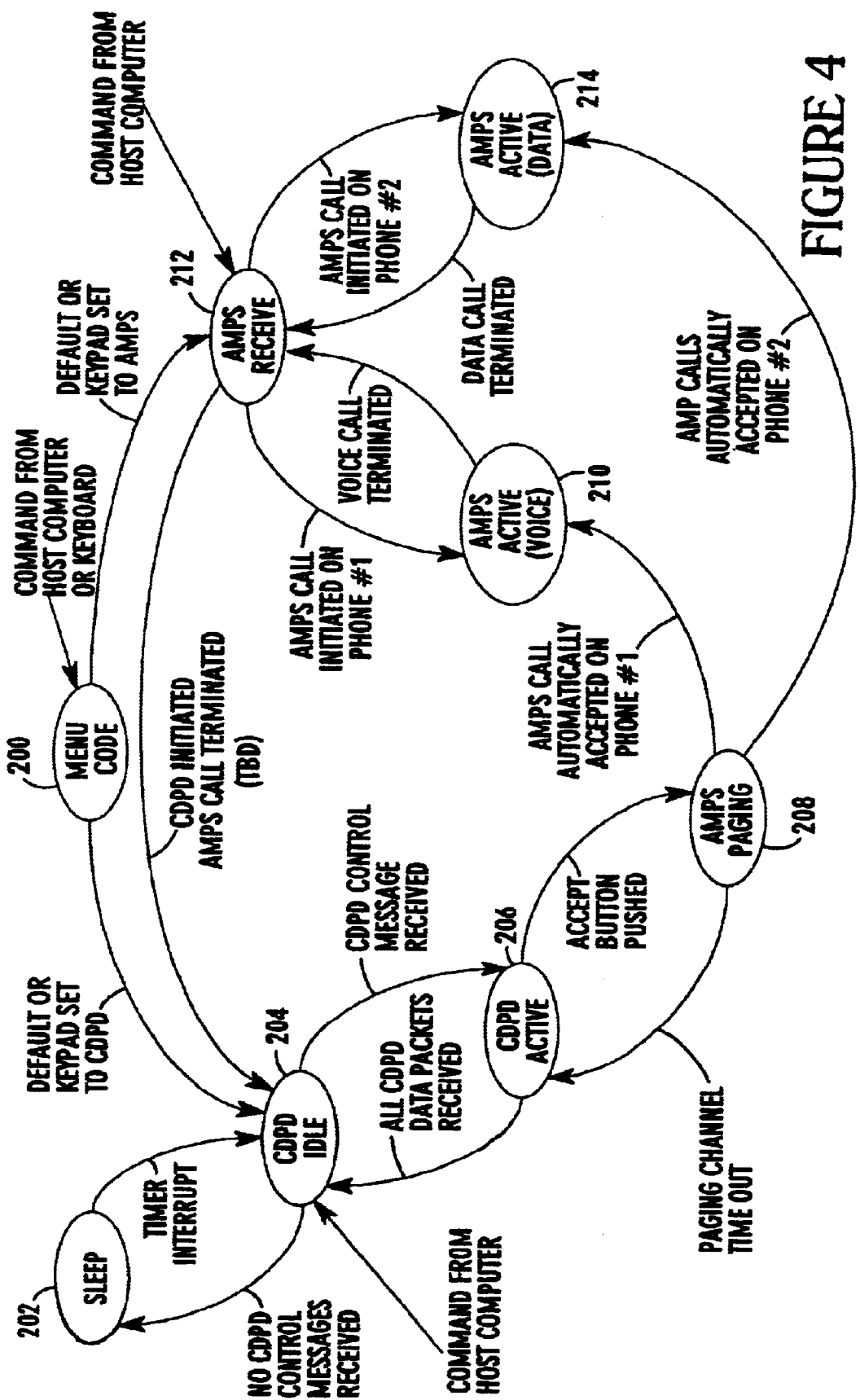
FIG. 4 is a block diagram of MDBS architecture.
Figure 5:
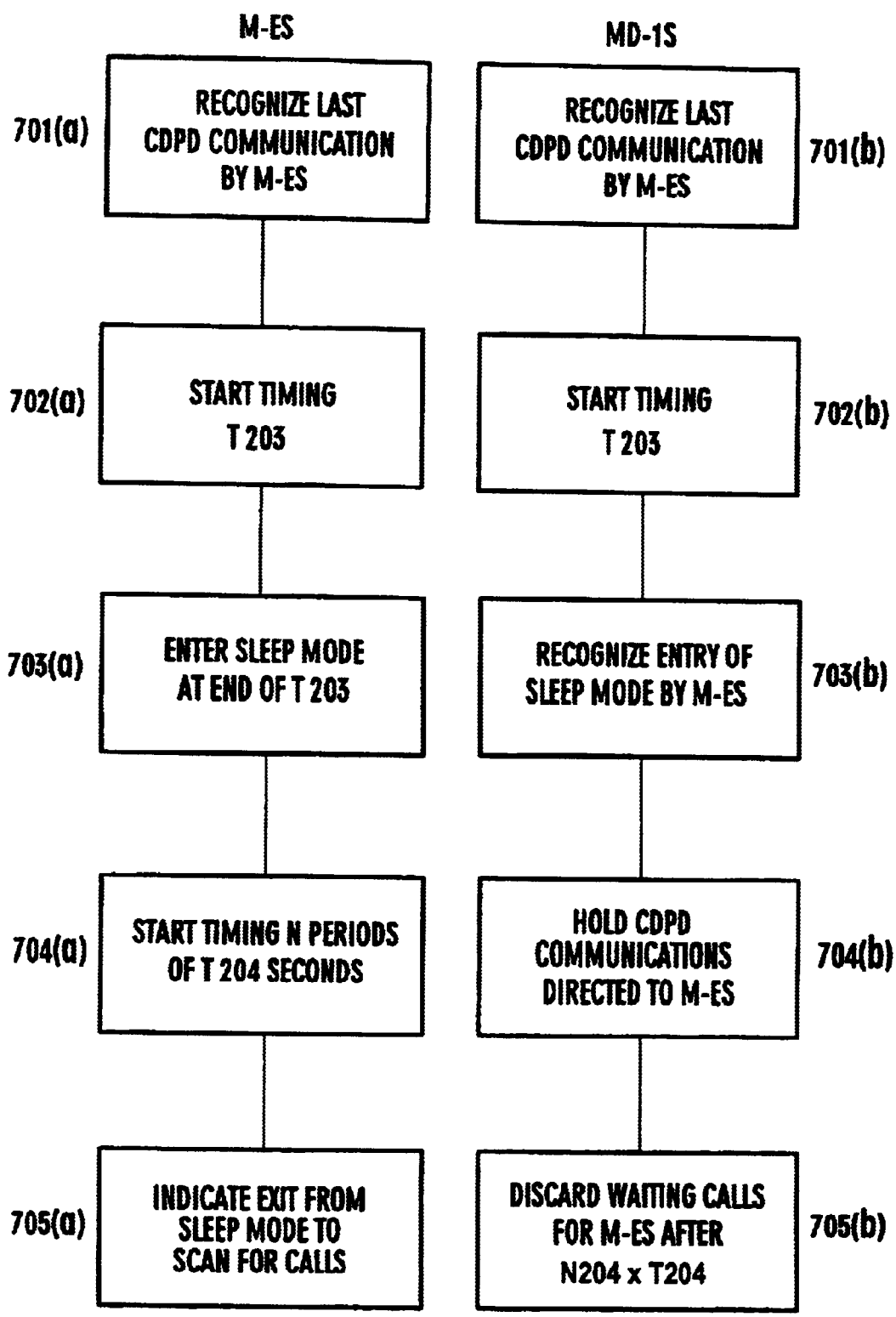
FIG. 5 is a flow chart depicting parallel operation between wireless subscriber station and an associated MD-IS.

In order to carry out the present invention, the MDBS (1 in FIG. 1) should be able to store TEI notification messages sent from the MD-IS (3 in FIG. 1). Once the epoch or segment 60 (in FIG. 6) expires, the MDBS should send the latest TEI messages out as indicated in segment 63 of FIG. 6. To do this, the MDBS uses a special buffer to hold the received TEI messages. Also, the MDBS has the capability of suspending normal operation of communication messages, as described earlier, in order to insert the TEI messages at the precise time that the transmission is predicted by the subscriber stations.

This embodiment has other constraints with respect to normal CDPD operation because the number of subscriber stations that might go into the awake state at any one notification interval (62 in FIG. 6) is larger than can be listed in a single 136-byte HDLC frame, the TEI list must be continued in subsequent HDLC frames. The unique starting TEI must occur only at the beginning of the first HDLC frame. The unique ending TEI must not occur until the end of the last HDLC frame. Because the subscriber station might not recognize the ending unique TEI message, the subscriber station must known what the upper limit for the HDLC frames is for a single notification. From this, the subscriber station can determine which is the last block that needs to be checked. Each maximum length HDLC frame of the notification period must occupy exactly four blocks. Only the last HDLC frame of the notification period may be shorter than this maximum length. It is necessary that these standards be adhered to by the MDBS in order to maintain the conditions necessary for the operation of the embodiment of the present invention.

Although a number of arrangements of the present invention have been mentioned by way of example, it is not intended that the invention be limited thereto. For example, the present invention can be adapted to use other arrangements for predicting control message transmission than that previously described. Accordingly, this invention should be considered and include any and all configurations, modifications, variations, combinations or equivalent arrangements falling within the scope of the following claims.

We claim:

1. A method of communicating between a base station and a plurality of wireless subscriber stations in a wireless communication system, whereas said base station controls a stream of message blocks including a plurality of Temporary Equipment Identifier (TEI) messages corresponding to respective ones of a plurality of said subscriber stations, the message blocks including a plurality of Forward Error Correction (FEC) bits which are decoded by the plurality of wireless subscriber stations to ensure the plurality of TEI messages have been received error free, said method comprising the steps of:

(a) arranging the plurality of TEI messages in a continuous group; and (b) beginning said group of TEI messages with a unique TEI message and ending said group of TEI messages with a second unique TEI message where said unique TEI messages differ from all other TEI messages by at least six characters eliminating the necessity of decoding the plurality of FEC bits.

2. A method of operating a wireless subscriber station in a wireless communications system to limit power expenditure in said wireless subscriber station, said wireless communications system including at least one base station for transmitting a communication stream of message blocks to a plurality of wireless subscriber stations, said method comprising the steps of:

(a) monitoring said communication stream for Temporary Equipment Identifier (TEI) message blocks, said TEI message blocks comprising TEI messages and a plurality of Forward Error Correction (FEC) bits;

(b) determining a Base Error Rate (BER) by comparing known bits of the communication stream with received bits of the communication stream wherein the BER is determined by comparing known bits of TEI overhead messages with received bits of the TEI overhead messages; and (c) decoding said FEC bits only when said BER is above a predetermined level.

3. The method according to claim 1, further comprising the step of assigning TEI for all wireless subscriber stations of the plurality of wireless subscriber stations located in a particular cell where the TEI for all wireless subscriber stations in the cell differ by at least six characters.

4. The method according to claim 3, wherein the TEI for all wireless subscriber stations are assigned on a random basis.

5. The method according to claim 3, further comprising the steps of:

checking if the TEI for all wireless subscriber stations in a particular cell differ by at least six characters; and reassigning TEI for at least one of all wireless subscriber stations in a particular cell so that the TEI for all wireless subscriber stations in the cell differ by at least six characters.

6. The method according to claim 3, further comprising the steps of:

checking if the TEI for all wireless subscriber stations in a particular cell differ by at least six characters; and reassigning TEI for at least one of all wireless subscriber stations in a particular cell on a random basis so that the TEI for all wireless subscriber stations in the cell differ by at least six characters.

7. The method according to claim 6, wherein the TEI for all wireless subscriber stations are assigned on a random basis.

8. A method of communicating between a base station and a plurality of wireless subscriber stations in a wireless communication system, whereas said base station controls a stream of message blocks including a plurality of Temporary Equipment Identifier (TEI) messages corresponding to respective ones of a plurality of said subscriber stations, the message blocks including a plurality of Forward Error Correction (FEC) bits which are decoded by the plurality of wireless subscriber stations to ensure the plurality of TEI messages have been received error free, said method comprising the steps of:

(a) arranging the plurality of TEI messages in a continuous group;

(b) beginning said group of TEI messages with a unique TEI message and ending said group of TEI messages with a second unique TEI message where said unique TEI messages differ from all other TEI messages by at least six characters;

(c) monitoring said communication stream for Temporary Equipment Identifier (TEI) blocks;

(d) determining a Base Error Rate (BER); and (e) decoding said FEC bits only when said BER is above a predetermined level.

9. The method according to claim 8, wherein step (b) BER is determined by comparing known bits of communication stream with received bits of the communication bits.

10. The method according to claim 8, wherein step (d) BER is determined by comparing known bits of TEI overhead messages with received bits of the TEI overhead messages.

11. The method according to claim 8, further comprising the step of assigning TEI for all wireless subscriber stations of the plurality of wireless subscriber stations located in a particular cell where the TEI for all wireless subscriber stations in the cell differ by at least six characters.

12. The method according to claim 11, wherein the TEI for all wireless subscriber stations are assigned on a random basis.

13. The method according to claim 11, further comprising the steps of:

checking if the TEI for all wireless subscriber stations in a particular cell differ by at least six characters; and reassigning TEI for at least one of all wireless subscriber stations in a particular cell so that the TEI for all wireless subscriber stations in the cell differ by at least six characters.

14. The method according to claim 11, further comprising the steps of:

checking if the TEI for all wireless subscriber stations in a particular cell differ by at least six characters; and reassigning TEI for at least one of all wireless subscriber stations in a particular cell on a random basis so that the TEI for all wireless subscriber stations in the cell differ by at least six characters.

15. The method according to claim 14, wherein the TEI for all wireless subscriber stations are assigned on a random basis.

16. The method according to claim 15, wherein step (d) the BER is determined by comparing known bits of communication stream with received bits of communication bits.

17. The method according to claim 16, wherein step (d) the BER is determined by comparing known bits of TEI overhead messages with received bits of the TEI overhead messages.

18. A base station controlling a stream of message blocks including a plurality of Temporary Equipment Identifier (TEI) messages corresponding to respective ones of a plurality of subscriber stations comprising:

(a) a transmission control mechanism for arranging the plurality of TEI messages in a continuous group, and beginning said group of TEI messages with a unique TEI message and ending said group of TEI messages with a second unique TEI message where said unique TEI messages differ from all other TEI messages by at least six characters whereby the necessity of decoding the plurality of FEC bits can be eliminated.

19. A wireless subscriber station comprising:
(a) a monitor for monitoring said communication stream for Temporary Equipment Identifier (TEI) blocks, said TEI message blocks comprising TEI messages and a plurality of Forward Error Correction (FEC) bits;
(b) an error rate detector for determining a Base Error Rate (BER); and
(c) a decoder for decoding said FEC bits only when said BER is above a predetermined level;
wherein the BER is determined by comparing known bits of TEI overhead messages with received bits of the TEI overhead messages.

20. The method according to claim 19, in which the transmission control mechanism assigns TEIs for all wireless subscriber stations of the plurality of wireless subscriber stations located in a particular cell where the TEI for each wireless subscriber stations in the cell differs by at least six characters from the TEI of any other wireless subscriber station in the cell.

21. The method according to claim 20, wherein the TEI for all wireless subscriber stations are assigned on a random basis.

22. The method according to claim 20, in which the transmission control mechanism is configured to check if the TEIs for all wireless subscriber stations in a particular cell differ from each other by at least six characters; and
reassigns a TEI for at least one of said wireless subscriber stations in a particular cell so that the TEIs for all wireless subscriber stations in the cell differ from each other by at least six characters.

23. The method according to claim 22, wherein in step (b) the BER is determined by comparing known bits contained in a communication stream with received bits from the communication stream.

24. A method of operating a wireless subscriber station in a wireless communication system having a base station in which said base station controls a stream of message blocks including a plurality of Temporary Equipment Identifier (TEI) messages corresponding to respective ones of a plurality of said subscriber stations, the message blocks including a plurality of Forward Error Correction (FEC) bits which are decoded by the wireless subscriber station to ensure the plurality of TEI messages have been received error free, said method comprising the steps of:
(a) monitoring said communication stream for Temporary Equipment Identifier (TEI) blocks;
(b) determining a Base Error Rate (BER) wherein the BER is determined by comparing known bits of TEI overhead messages with received bits of TEI overhead messages; and
(c) decoding said FEC bits only when said BER is above a predetermined level.

25. A communications system, comprising:
(a) at least one wireless subscriber station, comprising:
(1) a monitor for monitoring said communication stream for Temporary Equipment Identifier (TEI) blocks, said TEI message blocks comprising TEI messages and a plurality of Forward Error Correction (FEC) bits;
(2) an error rate detector for determining a Base Error Rate (BER); and
(3) a decoder for decoding said FEC bits only when said BER is above a predetermined level, and
(b) a base station controlling a stream of message blocks including a plurality of Temporary Equipment Identifier (TEI) messages corresponding to respective ones of a plurality of subscriber stations comprising:
(1) a transmission control mechanism for arranging the plurality of TEI messages in a continuous group, and beginning said group of TEI messages with a unique TEI message and ending said group of TEI messages with a second unique TEI message where said unique TEI messages differ from all other TEI messages by at least six characters whereby the necessity of decoding the plurality of FEC bits can be eliminated.

26. A memory medium, said memory medium having stored thereon a program for controlling a base station in which said base station controls a stream of message blocks including a plurality of Temporary Equipment Identifier (TEI) messages corresponding to respective ones of a plurality of said subscriber stations, said program comprising instructions for arranging the plurality of TEI messages in a continuous group and for beginning said group of TEI messages with a unique TEI message and ending said group of TEI messages with a second unique TEI message where said unique TEI messages differ from all other TEI messages by at least six characters whereby the necessity of decoding the plurality of FEC bits can be eliminated.

* * * * *

UNITED STATES PATENT AND TRADEMARK OFFICE
CERTIFICATE OF CORRECTION

PATENT NO. : 6,694,146 B1 Page 1 of 1
DATED : February 17, 2004
INVENTOR(S) : Hardin et al.

It is certified that error appears in the above-identified patent and that said Letters Patent is hereby corrected as shown below:

Title page,
Item [73], Assignee, should read -- Pacific Communication Sciences, Inc. --.

Signed and Sealed this

Fifteenth Day of March, 2005

JON W. DUDAS
*Director of the United States Patent and Trademark Office*